J. TABER.
Improvement in Wire-Scoops.
No. 130,767
Patented Aug. 20, 1872.
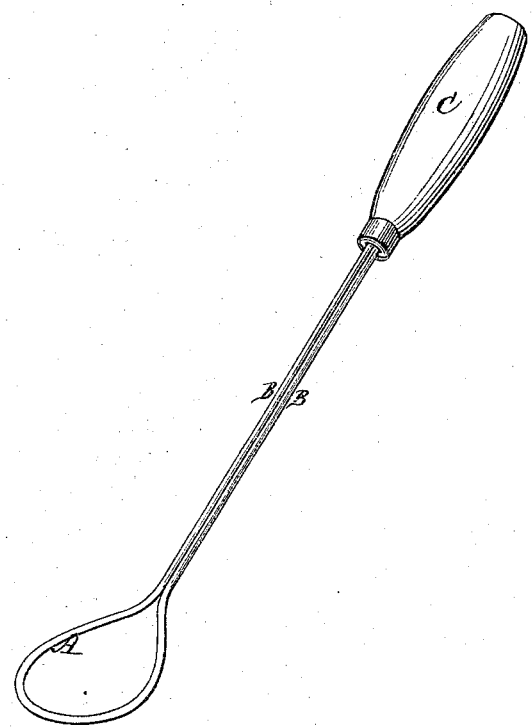
Witnesses
John A. Ellis.
Wm K. Ellis
Inventor
John Taber
Per.
T. H. Alexander & Co
Atty

UNITED STATES PATENT OFFICE.

JOHN TABER, OF SOUTH WOLFBOROUGH, NEW HAMPSHIRE.

IMPROVEMENT IN WIRE SCOOPS.

Specification forming part of Letters Patent No. 130,767, dated August 20, 1872.

SPECIFICATION.

*To all whom it may concern:*

Be it known that I, JOHN TABER, of South Wolfborough, in the county of Carroll and State of New Hampshire, have invented certain new and useful Improvements in Scoops; and I do hereby declare that the following is a full, clear, and exact description thereof, reference being had to the accompanying drawing and to the letters of reference marked thereon which form a part of this specification.

The nature of my invention consists in a device, made of a single piece of wire and attached to or formed with a suitable handle, to be used for the purpose of removing eggs, potatoes, or other articles from boiling water, frying doughnuts, or any other use to which it may be put.

In order to enable others skilled in the art to which my invention appertains to make and use the same, I will now proceed to describe how the same is or may be constructed, referring to the annexed drawing, which represents a perspective view of my device.

This device or instrument is made of a single piece of wire, bent in the middle so as to form an oval ring, A, which is further bent concave, as shown. The two ends B B of the wire run side by side, forming the stem or shank of the implement, of any desired length. The stem or shank B is then inserted in and firmly secured to a wooden handle, C. Or the wire may be made to form the handle; but on account of the wire conducting heat I prefer to use a wooden handle.

As a kitchen implement this device is very useful for a variety of purposes—for instance, such as frying doughnuts, removing eggs, potatoes, or other articles from boiling water, and for many other purposes.

Having thus fully described my invention, what I claim as new, and desire to secure by Letters Patent, is—

As a new article of manufacture, the within-described device, made of a single piece of wire to form the oval concave scoop A and stem or shank B, attached to or formed with a handle, C, as and for the purposes herein described.

In testimony that I claim the foregoing as my own I affix my signature in presence of two witnesses.

JOHN TABER.

Witnesses:
 BUEL C. CARTER,
 GEORGE F. HOW.